No. 811,120. PATENTED JAN. 30, 1906.
W. M. BARNES.
COLLAR AND CUFF SHAPER.
APPLICATION FILED JUNE 27, 1901.
2 SHEETS—SHEET 1.
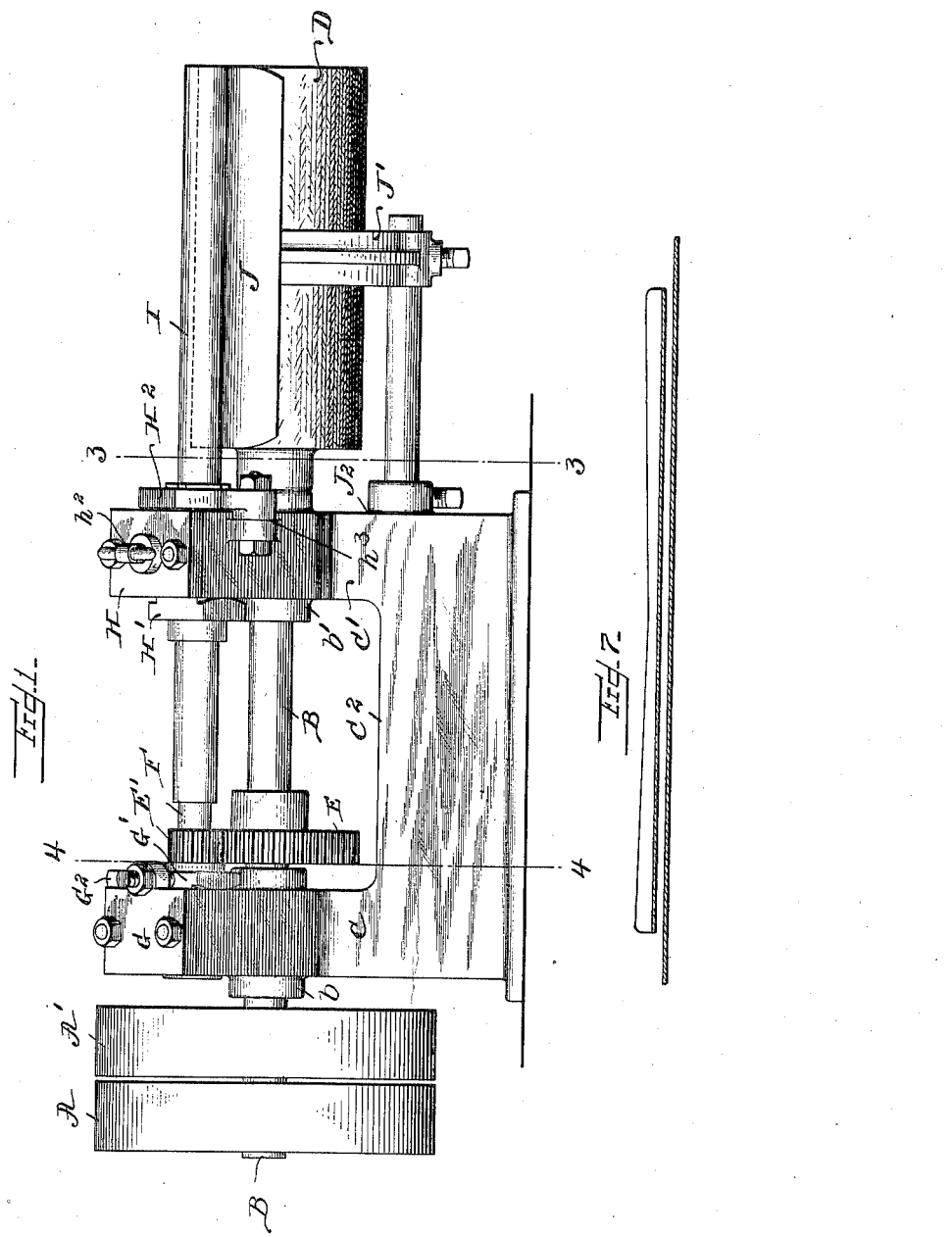
Witnesses.
Jesse B. Heller
M. T. Ellis.
Inventor:
William M. Barnes
per
Harding & Harding
Attorneys.

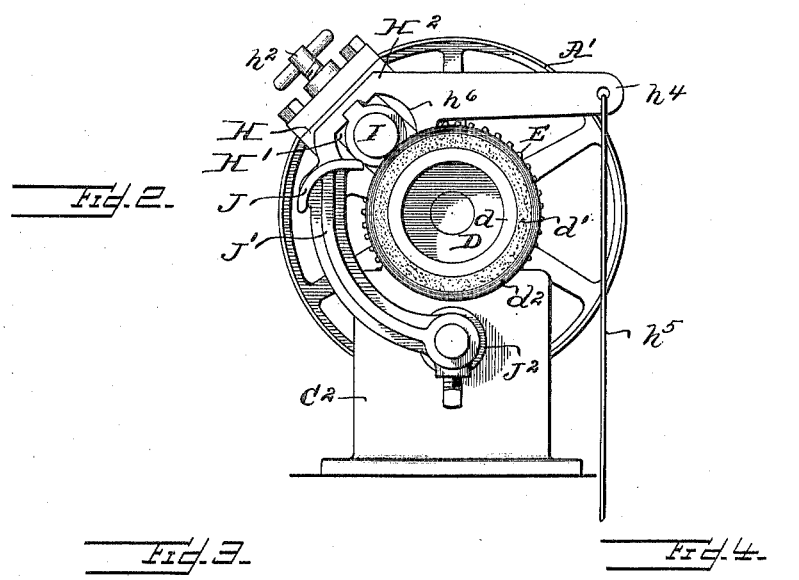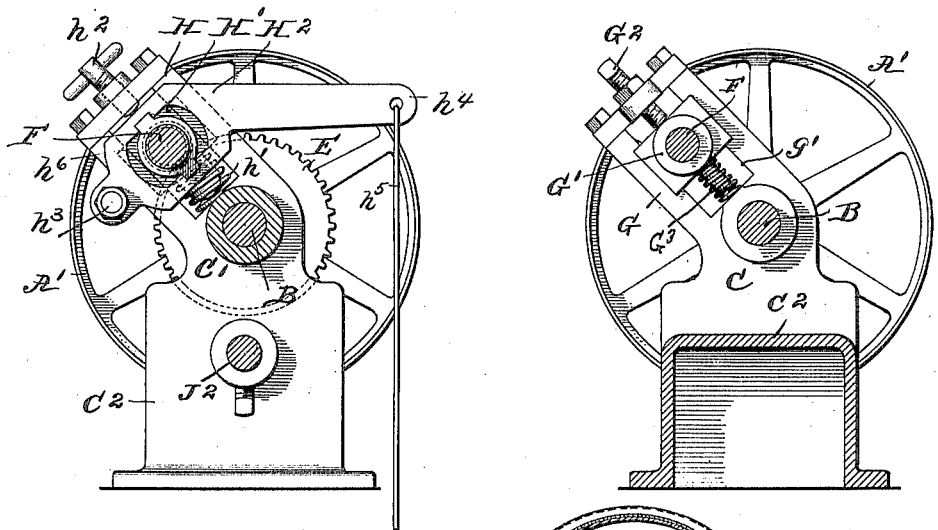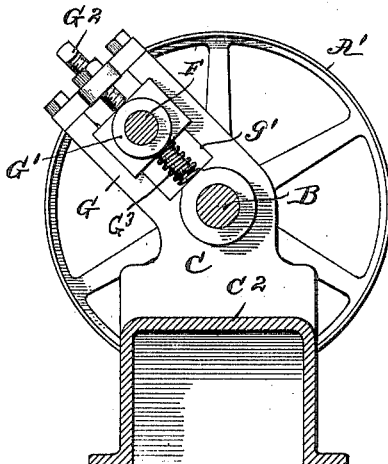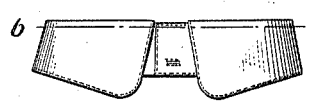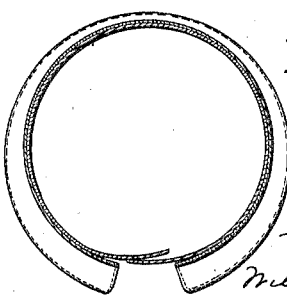

UNITED STATES PATENT OFFICE.

WILLIAM M. BARNES, OF PHILADELPHIA, PENNSYLVANIA.

COLLAR AND CUFF SHAPER.

No. 811,120.　　　Specification of Letters Patent.　　　Patented Jan. 30, 1906.

Application filed June 27, 1901. Serial No. 66,221.

*To all whom it may concern:*

Be it known that I, WILLIAM M. BARNES, a citizen of the United States, residing at Philadelphia, county of Philadelphia, and State of Pennsylvania, have invented a new and useful Improvement in Collar and Cuff Shapers, of which the following is a full, clear, and exact description, reference being had to the accompanying drawings, which form a part of this specification.

My invention has for its object to shape collars and cuffs. The purpose is to bring collars and cuffs after having been ironed from a flat condition to a rounded condition, so that they are properly shaped for the wearer or for boxing.

The mechanism I use to carry out this invention is such that the collars or cuffs are properly shaped and yet the ends are not crushed.

I will first describe the embodiment of my invention illustrated in the accompanying drawings and then point out the invention in the claims.

Figure 1 is a front view of my improved collar and cuff shaper. Fig. 2 is an end view of the same. Fig. 3 is a sectional view on the line 3 3 of Fig. 1. Fig. 4 is a sectional view on the line 4 4 of Fig. 1. Fig. 5 is a front view of a collar after it has been shaped. Fig. 6 is a sectional view on the line 6 6 of Fig. 5. Fig. 7 is a view similar to Fig. 6 before the collar is passed through the shaper.

A A' are respectively fast and loose pulleys on the shaft B. This shaft B is supported in bearings $b$ $b'$ on the standards C C' of the frame $C^2$ of the machine. Secured to the shaft B beyond the standard C' is the roller D. This roller is made of a central roller $d$, of iron, surrounding which is sheet-rubber $d'$, and surrounding the rubber is a fabric, preferably felt, $d^2$. Upon the shaft B is the gear E, meshing with the gear E' on the shaft F. Projecting from the standard C is the guide-frame G.

G' is a bearing supported in the guide-frame G, and within this bearing G' one end of the shaft F is journaled. This frame G is slotted, as at $g'$, to allow the bearing G', and with it the shaft F, to have a slight movement at that point, the movement being limited by the set-screw $G^2$ and the spring $G^3$ on opposite ends of the bearing G'. (See Fig. 4.) This enables the bearing G' to have a slight oscillating movement. The shaft F is supported in the standard C' in the following manner:

H is a frame projecting from the standard C'.

H' is a bearing mounted so as to slide within the frame H. Between the lower end of bearing H' and the standard C' is placed a spring $h'$, and a set-screw $h^2$ projects through the top of frame H to form a limiting-stop for the upward movement of the bearing H'. The spring $h'$ forms a spring-support for the bearing H' to hold the upper roll from contact with the lower roll.

$H^2$ is a frame pivoted to the frame of the machine at $h^3$, and from the frame projects a lever $h^4$, to which a rod $h^5$, connected to a foot-treadle, (not shown,) is secured. The frame $H^2$ has an elongated slot $h^6$, which surrounds a part of the bearing H'. Upon the outer end of the shaft F is the roller I. This roller I is above the roller D.

J is a guide-plate, shown curved. The end of this guide nearest the rolls D and I is out of line of the point of contact of said rolls—that is, a line drawn from said point to the adjacent end of said guide is at an angle to a line drawn tangent to said rolls at their point of contact. While I have shown the end of said guide below the contact-point of the rolls, it could be above. This guide-plate is supported by the arm J', secured to the frame of the machine in the boss $J^2$. By moving this arm on its pivot-point the distance of the guide-plate J from the rolls may be varied.

The operation is as follows, say, upon a collar: The collar after having been ironed is first dampened upon the folding-line and bent upon that line to the condition shown in Fig. 7. The roller I is normally held free from the roller D by means of the spring $h'$, and when in this position the collar is laid upon the guide-plate, which, as shown, is curved and is passed over the roller D until one end lies upon said roller. The rod $h^5$ is then operated, which moves the bearing H', so as to move said bearing against the action of spring $h'$ and the roller I in contact with roller D. The roller D is driven directly from pulley A, and the roller I is revolved in reverse direction by the gears E and E'. When the rollers D and I are brought together, as described above, the collar is fed between the rolls over the guide-plate J. By reason of the position of the guide J the collar is fed to the rollers so that it is brought by the action of the rolls to the condition shown in Figs. 5 and 6. When the collar has passed between the rolls up to the point of the other end of the collar, the rolls are separated. By this mechanism the operation of the rollers are at all times under the control of the operator. So long as the rod $h^5$ is operated the contact of the rolls is maintained. The operator is thus enabled to shape the main portion of the collar and to release the rolls from contact when the ends are reached, thus rolling the collar without crushing the ends. The collar is then of such shape as to adapt it either for boxing or for use. If the position of the end of the guide be reversed, so that the article be fed to the rolls from below instead of from above, the curve shape will be reversed.

While I have shown and spoken of a particular form of collar, my invention is not limited to any particular form of collar or to collars, as it may be used for cuffs.

Having now fully described my invention, what I claim, and desire to protect by Letters Patent, is—

1. In a collar and cuff shaping machine, in combination, a pair of rollers, one above the other, a shaft for the upper roller, a frame having a slotted portion, a bearing within the slotted portion of said frame, said bearing being adapted to oscillate therein, a spring supporting said bearing and a set-screw above said bearing, said bearing being adapted to support the end of the upper roller-shaft remote from said roller.

2. In a collar and cuff shaping machine, in combination a pair of rollers one above the other, a shaft for the upper roller, said shaft being supported at its end remote from the roller so as to be adapted to oscillate, and supported at its end adjacent the rolls in a bearing sliding in the framework of the machine, a pivoted frame surrounding said bearing adjacent the rolls, a spring normally holding said bearing and frame in raised position and the upper roller free from the lower roller, a lever projecting from said frame, a rod projecting from said lever whereby, on the movement of said rod, the frame is moved to bring the upper roller in contact with the lower roller.

In testimony of which invention I have hereunto set my hand, at Philadelphia, on this 22d day of June, 1901.

WILLIAM M. BARNES.

Witnesses:
M. F. ELLIS,
M. M. HAMILTON.